United States Patent

[11] 3,557,704

| [72] | Inventor | Christopher Durrant English<br>Burnwell, England |
|---|---|---|
| [21] | Appl. No. | 817,487 |
| [22] | Filed | Apr. 18, 1969 |
| [45] | Patented | Jan. 26, 1971 |
| [73] | Assignee | Tracked Hovercraft Limited<br>London, England<br>a British Company |
| [32] | Priority | June 19, 1968 |
| [33] | | Great Britain |
| [31] | | 18683 |

[54] ELECTRO-MAGNETICALLY PROPELLED VEHICLE
11 Claims, 6 Drawing Figs.

[52] U.S. Cl. .................................... 104/148,
104/23; 105/49, 76, 145
[51] Int. Cl. ..................................... B60l 9/00,
B60m 1/30; B61b 13/04
[50] Field of Search.......................... 104/148,
148(LM), 23, 23FS, 147; 191/45; 105/49, 145,
(Inquired)

[56] References Cited
UNITED STATES PATENTS

| 3,198,139 | 8/1965 | Dark ............................ | 104/148 |
| 3,460,485 | 8/1969 | Easton.......................... | 104/148 |
| 3,500,765 | 3/1970 | Easton et al. ................ | 104/148 |

Primary Examiner—Arthur L. LaPoint
Assistant Examiner—Richard A. Bertsch
Attorney—Cameron, Kerkam and Sutton ABSTRACT: A vehicle propelled by a double sided linear induction motor has a linkage connecting the stator to the vehicle. The linkage includes two main links on opposite sides of the stator lying in a plane in which the tractive forces also lie. Each main link is connected to the stator and to a rotatable crank on the vehicle. The rotatable cranks are interconnected by a cross link. The linkage does not transmit yawing, rolling, pitching, lateral or vertical movements of the vehicle to the stator.

PATENTED JAN 26 1971

ELECTRO-MAGNETICALLY PROPELLED VEHICLE

This invention relates to an electromagnetically propelled vehicle which travels along a prepared track, and particularly but not exclusively to a vehicle which is supported out of contact with, and guided along, the track at least partially by gas pressure acting on the vehicle.

Proposals have been made to propel vehicles along a prepared track by use of a linear induction motor, and one proposal is described in U.S. Pat. No. 3,356,041. The most convenient arrangement for the use of a linear induction motor for propelling a vehicle is to mount the energized part or stator of the motor on the vehicle. The nonenergized part or rotor of the motor with which the stator cooperates, can then consist of an electrically conducting rail extending along the track.

It is known that there are advantages if the stator is formed in two parts, on opposite sides of the linear motor rail, (which can simply be an electrically conducting plate, with parallel faces) so that the magnetic field extends from one part of the stator, through the rail, to the other part of the stator. The efficiency of a linear motor depends to a large extent on the air gap between the stator and the rail being kept to a minimum, and it has been found that this creates a problem in mounting the stator on the vehicle since the vehicle is liable to move to some extent relative to the track under the action of wind forces or aerodynamic forces when travelling at high speed. The vehicle may move in five possible senses (in addition to movement along the rail). These senses are; movement in the lateral and vertical directions, and also rotation in any of three mutually perpendicular planes. Rotation in a horizontal plane is known as yawing; in a vertical plane perpendicular to the direction of travel is known as rolling; and in a vertical plane parallel to the direction of travel is known as pitching.

Where the stator is doubled sided and the rail is a vertical plate, yawing creates a particular problem since the stator may be quite long and extends parallel to the linear motor rail. Where the stator is doubled sided and the rail is a horizontal plate, a similar problem is created by pitching, and it is one object of the invention to provide a mounting for the stator which allows some freedom of movement for the stator relative to the vehicle to permit the stator to remain nearly parallel to the rail.

According to the invention there is provided a vehicle for travelling along a prepared track, said vehicle being connected to at least one stator of a linear induction motor for driving the vehicle by cooperation with a linear motor rail extending along the track means for spacing said stator from the rail, characterized in that opposite sides of said stator each carry one of a first pair of connection points and the vehicle carries a second pair of laterally spaced connection points and characterized in that said pairs of connection points are interconnected by a linkage which includes:
 a. a pair of main links extending generally in the direction of motion of the vehicle, one end of each main link being connected respectively to one connection point of one pair of said connection points;
 b. a pair of cranks each rotatably connected to one connection point of the other pair of connection points, the other ends of each main link being connected respectively to one crank of the pair of cranks; and
 c. a cross link extending transversely to the main links and interconnecting the cranks in such a manner that an increase in the distance between a connection point on one side of the stator and the associated connection point on the vehicle on the same side results in rotation of both cranks in the same sense and results in a decrease in the distance between the connection point on the other side of the stator and the other connection point on the vehicle.

When the vehicle yaws, in a doubled-sided arrangement where the rail is a vertical plate, or pitches, in a double-sided arrangement where the rail is a horizontal plate, one of the connection points on the vehicle will advance very slightly with respect to the other. This movement is accommodated by the linkage and the stator can remain parallel with rail.

The means spacing the stator from the rail can consist of wheels mounted on the stator and running on the rail, or could consist of air cushion pads as illustrated in U.S. Pat. No. 3,460,485.

The tractive or braking forces are transmitted via the main links from the stator to the vehicle. Preferably, the linkage is arranged so that the forces are taken in tension in the main links. In order not to subject the main links to compression, the stator is preferably connected to the vehicle by a second linkage of the kind defined above, arranged effectively as the mirror image about a plane transverse to the rail of the first linkage so that tractive forces are taken in tension in the main links of one linkage and braking forces are taken in tension in the main links of the other linkage. The main links may therefore be arranged so as to be incapable of taking compression.

Each linkage could be arranged with the respective cranks rotatably connected to the first pair of connection points (i.e. carried on the stator) but, preferably, they are connected to the respective second pair of connection points (i.e. carried on the vehicle).

The cranks and cross link are preferably so disposed so that the cross link is in tension when the main links are in tension, but the arrangement could be such that the cross link is in compression when the main links are in tension.

Preferably, the main links lie in the plane in which the forces produced by the stator also lies. This has the result that any sudden increase in the forces transmitted will not place a moment on the stator tending to ride it off the rail. By considering symmetry it is evident that the resultant of the forces extends along the middle of the gap between the stator parts.

In one double-sided arrangement the main links lie in a plane perpendicular to the rail, but in other double-sided arrangements the main links may lie in a plane inclined to the rail. The inclined arrangement is particularly useful where the stator is adapted to cooperate with a downwardly extending rail at one side of the track. In such an arrangement the cross link will pass below the stator parts.

Each crank preferably has two arms extending outwardly from the axis of rotation, with a main link connected to one arm and the cross link connected to the other arm. The arms of each crank can be disposed to rotate in different planes and in this way the cross link can be disposed to cross the stator and the rail while the main links lie in the same plane as the stator forces. The arms of the cranks to which the main links are connected could extend from their axes away from each other, but preferably extend towards each other so that the main links are closer together and the linkage is more compact.

The linkage by itself provides a coupling between the stator and the vehicle only in the direction of travel of the vehicle and allows limited movement between stator and vehicle in the other five senses described above. The stator can be supported from the rail independently of the vehicle so that in a double-sided arrangement movement of the vehicle in a direction in the plane of the plate forming the rail and perpendicular to the direction of travel is not transmitted to the stator so that the rail does not have to be a deep rail with a consequent saving in the cost of the track. If, on the other hand, in a double-sided arrangement the rail is a deep vertical rail, an additional coupling can be provided between the stator and the vehicle so that the vehicle supports the stator to move vertically with the vehicle. This additional coupling preferably is such that it does not transmit rolling movements of the vehicle to the stator.

Figure 1:
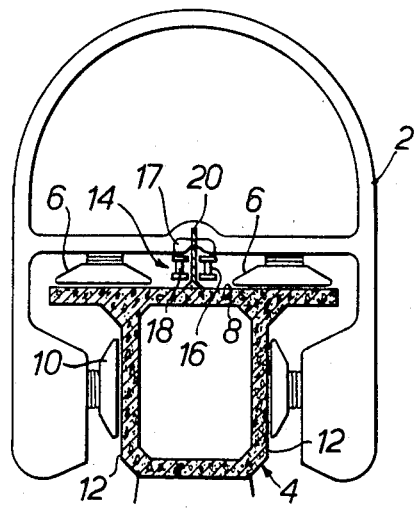
FIG. 1 is a diagrammatic cross-sectional view of one vehicle according to the invention.

FIG. 1 shows a vehicle 2 which travels along a prepared track 4 supported out of contact with, and guided along, the track 4 by air pressure acting on the vehicle 2. The vehicle 2 has two pairs of air cushion pads 6, one pair at each end of the vehicle, (only one pair is shown in FIG. 1) for forming cushions of pressurized air which support the vehicle 2 on a supporting surface 8 of the track 4. The vehicle also has two pairs of air cushion pads 10, one pair near each end of the vehicle, (only one pair is shown in FIG. 1) for forming cushions of pressurized air which guide the vehicle from side surfaces 12 of the track 4. The pads 6 and 10 have nozzles around their periphery which form a curtain of air, so that air cushions are contained between the vehicle 2 and track 4.

The vehicle 2 carries the stator 14 of a linear induction motor formed in two parts 16 and 18 rigidly interconnected and disposed on opposite sides of a linear motor rail 20 extending along the track 4.

The rail 20 is of an inverted T-form, the leg of the T constituting a plate which is upstanding in the center of the supporting surface 8 of the track 4.

The linear induction motor is arranged to operate as described in British specification No. 1,033,925.

Figure 2:
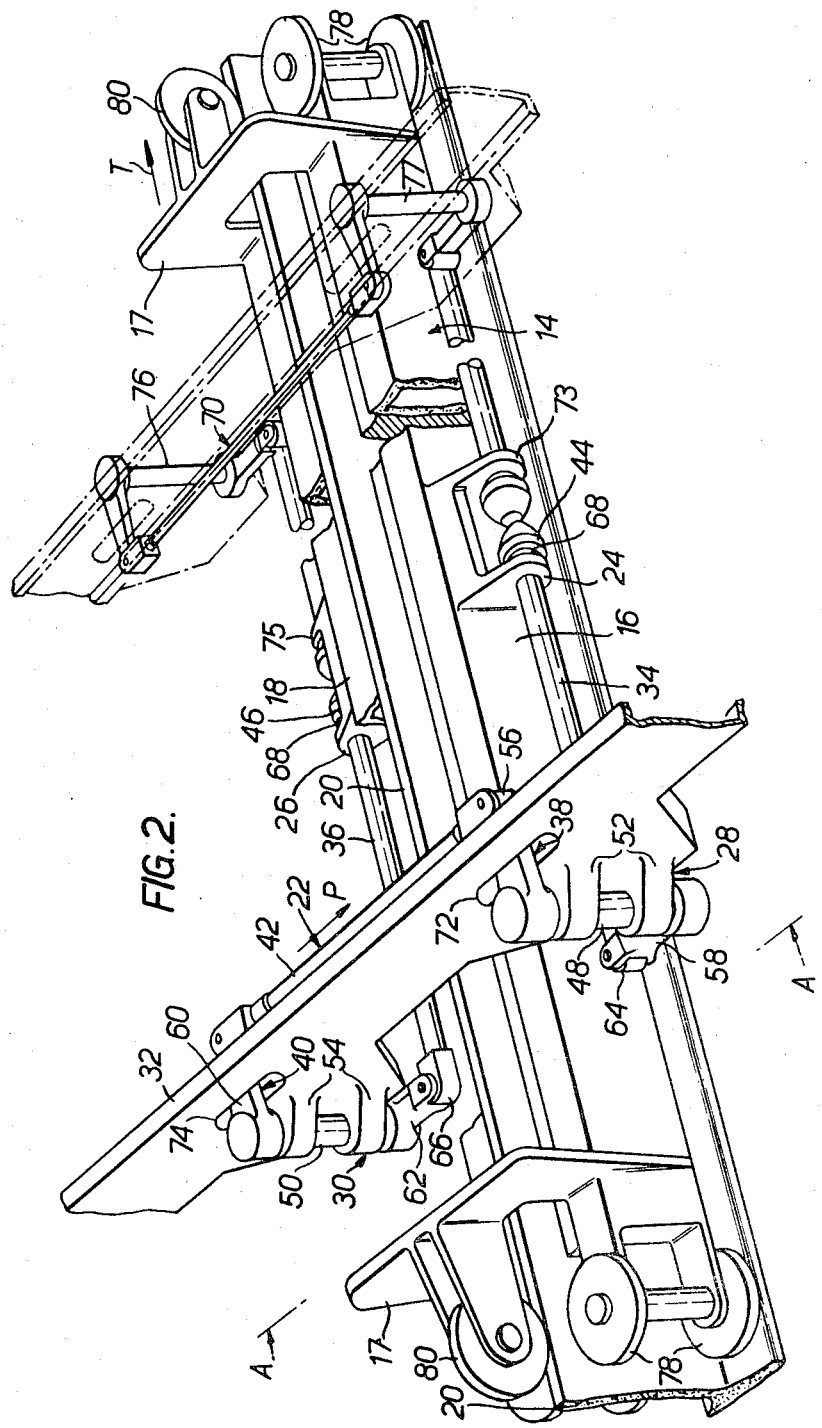
FIG. 2 is a perspective view, partly in diagrammatic form, of the linkage connecting the stator to the vehicle shown in FIG. 1 (the end windings of the stator are not shown)

The stator 14 is connected to the vehicle 2 by the linkage 22 shown in FIG. 2, the normal direction of travel of the vehicle 2 being indicated by the arrow T.

The stator parts 16 and 18 are rigidly connected together by yokes 17 and carry a first pair of connection points 24 and 26. A beam 32 forming part of the vehicle structure carries a second pair of connection points 28 and 30 spaced on opposite sides of the rail 20. The two pairs of connection points 24, 26, 28 and 30 are interconnected by the linkage 22.

The linkage 22 includes a pair of main links 34, 36, a pair of cranks 38, 40 and a cross link 42. The main links 34, 36 extend parallel to the stator parts 16, 18 and the end 44 of the link 34 is connected to the connection points 24, on the stator parts 16, and the end 46 of the link 36 is connected to the connection point 26 of the stator part 18. The main links 34 and 36 lie in the plane passing through the centerline of the stator parts 16, 18 as seen in a side view or end view (see FIG. 3).

The crank 38 has a pivot spindle 48 connected to the connection point 28, and the crank 40 has a pivot spindle 50 connected to the connection point 30. The connection points 28 and 30 are each constituted by two lugs 52, 54 on the beam 32 through which the pivots 48, 50 extend. The crank 38 has two arms 56 and 58 and the crank 40 has two arms 60 and 62 extending outwardly from the pivot spindles 48 and 50 respectively. The arms 56 and 58 are at right angles to each other, as are the arms 60, 62. The arms 58 and 62 extend towards each other in the same plane and are connected to the main links 34, 36 with joints 64, 66 allowing limited universal movement between links 34, 36 and arms 58, 62.

The arms 56 and 60 extend in the direction of travel T and lie in a plane above the arms 58 and 62. The ends of the cross link 42 are pivoted to the ends of the arms 56 and 60, the link 42 passing above the rail 20 and stator parts 16, 18. The arms 56, 60 pass through holes 72, 74 in the beam 32 so that the linkage is as compact as possible. The beam 32, could, of course, have been disposed on the other side of the pivots 48, 50.

A second linkage 70 shown partly diagrammatically also interconnects the stator 14 and vehicle 2. The linkage 70 is identical to the linkage 22 but is reversed as shown in FIG. 2. The linkage 70 connects a pair of connection points 73, 75 on the stator with a pair of connection points on the vehicle shown diagrammatically at 77 and 76.

The ends 44, 46 of the main links 34 and 36 are connected to the points 24, 26 with limited universal joints including rubber thrust pads 68.

The stator parts 16 and 18 are located laterally with respect to the rail 20 and spaced from the rail by a pair of wheels 78 at each end of each stator part 16 and 18. A wheel 80 is also mounted on each of the yokes 17 and runs along the top of the rail 20.

Consider now linkage 22 with the stator 14 pulling the vehicle 2 so that it travels in the direction T. The tractive forces are transmitted to the beam 32 with the main links 34 and 36 and the cross link 42 in tension.

Rotation of the cranks 38 and 40 under the action of the main links is resisted by tension in the cross link 42. During forward movement the linkage 70 transmits no force between the stator 14 and vehicle 2 but when the vehicle is braked electromagnetically by means of the stator 14 the braking forces will be transmitted to the vehicle by the linkage 70 with its links in tension and the linkage 22 will transmit no forces. The links 34 and 36 are therefore never in compression.

It will be seen that the linkages 22 and 70 allow a limited freedom of movement for the stator 14 relative to the vehicle 2 in all senses except movement in the direction T. The rubber thrust pads allow slight fore and aft play of the main links 34 and 36, for instance if there is lateral movement between the stator 14 and vehicle 2. This play is controlled by dampers and tapering of the thrust pads in a known manner. The main links 34, 36 are of a sufficient length to keep the resultant lateral forces produced when there is lateral movement between the stator and vehicle within acceptable limits.

Consider the vehicle 2 yawing so that its front end moves to the right of the track and its rear end moves to the left. The pivot spindle 50 will accordingly advance to a slight extent with respect to the pivot spindle 48. In other words the distance between pivot spindle 48 and connection point 24 is greater than normal and the distance between pivot spindle 50 and connection 26 is less than normal. Both cranks 38 and 40 will therefore rotate in a clockwise sense relative to the vehicle as viewed from above and cross link 42 will move in the direction of arrow P relative to the vehicle. The stator 14 meanwhile remains parallel with the rail 20 since it is located laterally with respect to the track by the wheels 78. The fact that there are two wheels 78 side by side at each end of each stator part 16, 18 means that the stator 14 is restrained against rolling movement even if the vehicle rolls.

If the vehicle lifts or pitches the stator 14 will not also lift or pitch since the linkages 22, 70 cannot transmit vertical forces, even though the stator 14 is not restrained against upward vertical movement. The wheels 80, of course, restrain the stator 14 against downward vertical movement.

Figure 3:
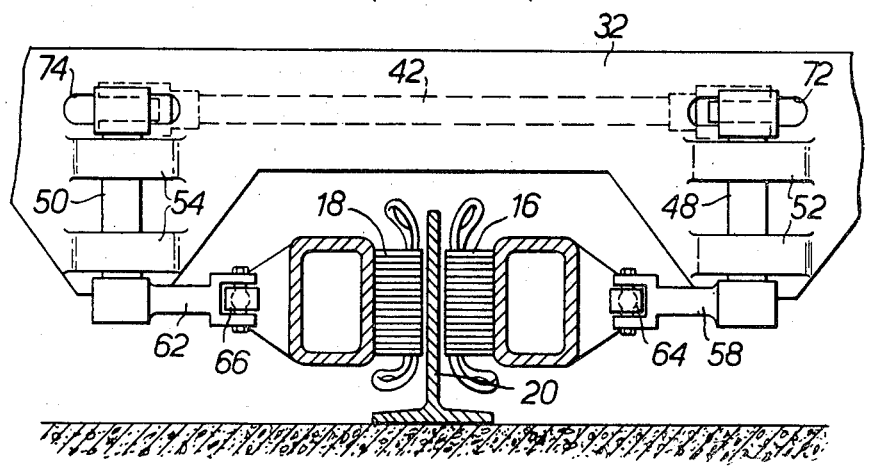
FIG. 3 is a section on the line A-A of FIG. 2.
Figure 4:
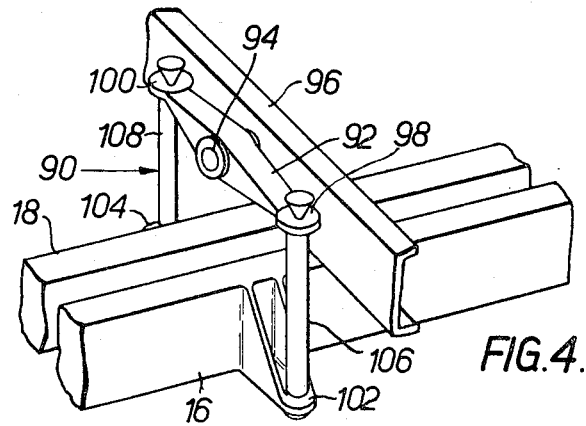
FIG. 4 is a perspective view of an additional coupling for use with a modified embodiment of the invention.

The embodiment of the invention illustrated in FIGS. 1, 2 and 3 can be modified by dispensing with the wheels 80 and instead using additional linkages 90 illustrated in FIG. 4.

The additional linkage 90 includes a lever 92 pivoted at 94 to a cross member 96 forming part of the vehicle structure. The ends 98, 100 of the lever 92 are connected to lugs 102, 104 on the stator parts 16, 18 by vertical links 106, 108. Two linkages 90 are connected to the stator 14, one near each end of the stator. Vertical movement of the vehicle will now be transmitted to the stator 14, but if the vehicle rolls the lever 92 of each linkage 90 will pivot about the point 94 and the stator 14 will not roll.

Figure 5:
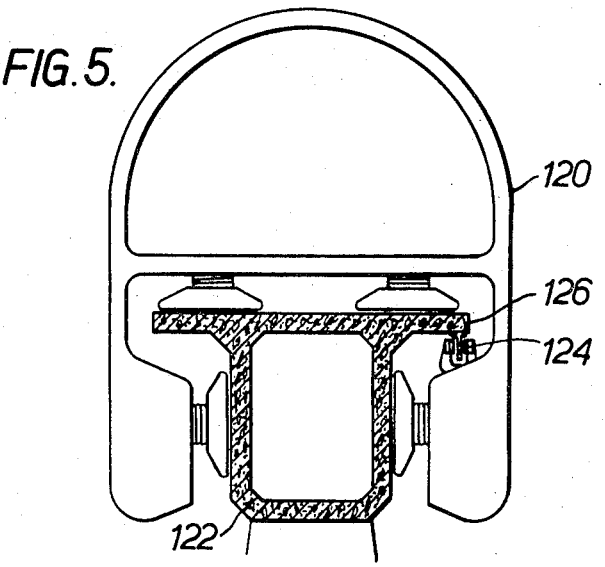
FIG. 5 is a diagrammatic cross-sectional view of another vehicle according to the invention.

FIG. 5 shows another tracked hover craft 120 on a track 122. This differs from FIG. 1 in that the rail 124 depends downwardly from a lateral extension 126 of the track 122.

Figure 6:
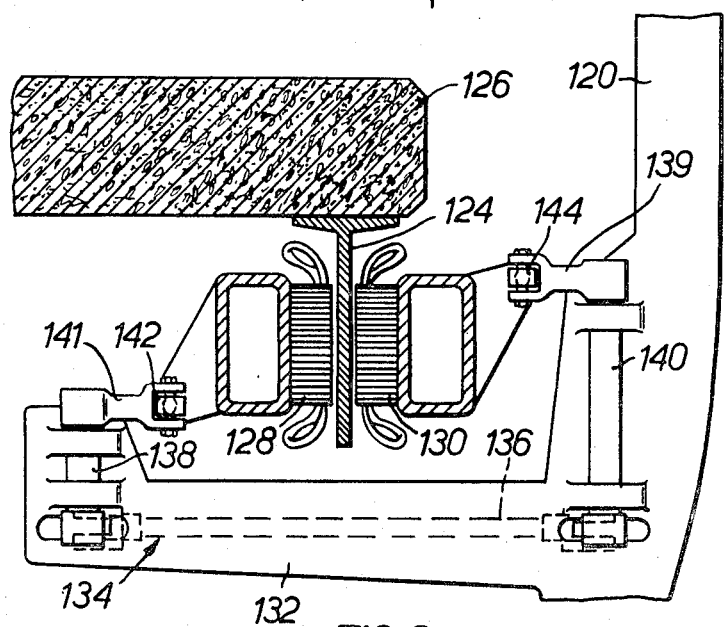
FIG. 6 is an end view of the linkage for the vehicle of FIG. 5.

FIG. 6 shows the stator parts 128, 130 connected to a frame member 132 of the vehicle 120 by a linkage 134 according to the invention. The linkage 134 is similar to that shown in FIGS. 2 and 3 except that the cross link 136 passes below the stator parts 128, 130 and the pivot spindle 140 of the crank 139 is longer than the pivot spindle 138 of the crank 141. It will be seen that with the spindles 138 and 140 as shown the main links 142, 144 lie in a plane inclined to the rail, in which plane the tractive force produced by the stator also lies.

As is evident from the accompanying drawings and related description, each linkage 22, 70 and 134 in accordance with the invention operates in a manner to maintain the forces separately transmitted between the vehicle and the stator by the main links substantially equal.

I claim:

1. A vehicle for travelling along a prepared track, said vehicle having connected thereto at least one stator of a linear induction motor for driving the vehicle by cooperation with a linear motor rail extending along the track, including means for spacing said stator from the rail, characterized in that opposite sides of said stator each carry one of a first pair of connection points and the vehicle carries a second pair of laterally spaced connection points, and characterized in that said pairs of connection points are interconnected by a linkage which includes:

a. a pair of main links extending generally in the direction of motion of the vehicle, one end of each main link being connected respectively to one connection point of one pair of said connection points;

b. a pair of cranks each rotatably connected to one connection point of the other pair of connection points, the other ends of each main link being connected respectively to one crank of the pair of cranks; and c. a cross link extending transversely to the main links and interconnecting the cranks in such a manner that an increase in the distance between a connection point on one side of the stator and the associated connection point on the vehicle on the same side results in rotation of both cranks in the same sense and results in a decrease in the distance between the connection point on the other side of the stator and the other connection point on the vehicle.

2. A vehicle for travelling along a track, said vehicle having connected thereto a stator of a linear induction motor for driving the vehicle and including means for spacing said stator from a linear motor rail extending along the track, characterized in that opposite sides of said stator each carry one of a first pair of laterally spaced connection points and the vehicle carries a second pair of laterally spaced connection points, and characterized in that said pairs of connection points are interconnected by a linkage which includes:

a. a pair of main links extending generally in the direction of motion of the vehicle for transmitting a longitudinally directed force between the vehicle and the stator, one end of each main link being connected respectively to one connection point of one pair of said connection points;

b. a pair of cranks each rotatably connected to one connection point of the other pair of connection points, the other ends of each main link being connected respectively to one crank of the pair of cranks; and c. a cross link interconnecting the cranks in such a manner that, should the vehicle move relatively to the rail so that the distance between a connection point on one side of the stator and the associated connection point on the vehicle on the same side increases and the distance between the connection point on the other side of the stator and the other connection point on the vehicle decreases, the linkage operates with rotation of the cranks to maintain the forces separately transmitted between the vehicle and the stator by the two said main links substantially equal.

3. A vehicle as claimed in claim 2, wherein the stator comprises two similar and opposed parts spaced apart for cooperation with a linear induction motor rail extending between them, and in which each stator part carries one of said first pair of connection points, and the main links are arranged for transmitting to the vehicle tractive or braking force produced by the stator and lie on a plane which includes the lines of action of the two stator parts.

4. A vehicle as claimed in claim 2, wherein the stator is connected to the vehicle by two said linkages, one of which is arranged for transmitting to the vehicle tractive force produced by the stator and the other of which is arranged for transmitting to the vehicle braking force produced by the stator.

5. A vehicle as claimed in claim 2, wherein the linkage is arranged for transmitting the respective longitudinally directed forces between the vehicle and the stator by tension in the main links.

6. A vehicle as claimed in claim 5, wherein the main links are each arranged so as to be incapable of taking compression.

7. A vehicle as claimed in claim 2, wherein the cranks of the linkage are rotatably connected to the second pair of connection points on the vehicle.

8. A vehicle as claimed in claim 7, wherein the cranks are arranged and connected to rotate in the same sense.

9. A vehicle as claimed in claim 8, wherein the main links are generally parallel to the longitudinal axis of the vehicle for acting in tension to transmit to the vehicle tractive or braking force produced by the stator, and each crank has first and second arms extending outwardly from the crank axis of rotation, the first arms of the two cranks extending generally inwardly of the stator and being connected to respective ones of the main links, and the second arms of the two cranks extending generally longitudinally of the stator and being connected together by the cross link extending therebetween.

10. A vehicle as claimed in claim 9, wherein the first and second arms of each crank are spaced apart along the crank axis of rotation, and the second arms are generally parallel to the main links and extend from the cranks in the same direction as the main links, whereby the cross link is in tension when the main links are operative to transmit to the vehicle tractive or braking force produced by the stator.

11. A vehicle for travelling along a prepared track, said vehicle being connected to at least one stator of a linear induction motor for driving the vehicle, said stator being formed in two parts interconnected against longitudinal movement relative to each other, and disposed on opposite sides of a linear motor rail extending along the track, including means for spacing said parts from the rail, characterized in that said stator parts each carry one of a first pair of connection points and the vehicle carries a second pair of connection points spaced on opposite sides of the rail, and characterized in that said pairs of connection points are interconnected by a linkage which includes:

a. A pair of main links extending generally in the direction of motion of the vehicle, one end of each main link being connected respectively to one connection point of one pair of said connection points:

b. A pair of cranks each rotatably connected to one connection point of the other pair of connection points, the other ends of each main link being connected respectively to one crank of the pair of cranks: and c. A cross link extending transversely to the main links and interconnecting the cranks in such a manner that increase in the distance between a connection point on one stator part and the connection point on the vehicle on the same side of the rail results in rotation of both cranks in the same sense and results in the distance between the connection point on the other stator part and the other connection point on the vehicle decreasing.

PO-1050
(5/69)

UNITED STATES PATENT OFFICE
CERTIFICATE OF CORRECTION

Patent No. 3,557,704          Dated January 26, 1971

Inventor(s) Christopher Durrant English

It is certified that error appears in the above-identified patent and that said Letters Patent are hereby corrected as shown below:

Cover page, item [32], the priority date "June 19, 1968" should read --April 19, 1968--. Column 2, line 2, after "wit" insert --the--; line 7, "The tractive" should read --Tractive Column 4, line 62, "hover craft" should read --hovercraft--.

Signed and sealed this 8th day of June 1971.

(SEAL)
Attest:

EDWARD M. FLETCHER, JR.          WILLIAM E. SCHUYLER, JR.
Attesting Officer          Commissioner of Patents